No. 827,378. PATENTED JULY 31, 1906.
W. P. LEWIS.
ART OF MAKING COPPER COATED IRON OR STEEL SHEETS.
APPLICATION FILED NOV. 23, 1905.

WITNESSES
Jos. J. Hosler.
Minnie F. Anthony.

INVENTOR
William P. Lewis
BY
Harry Frease.
ATTORNEY

UNITED STATES PATENT OFFICE.

WILLIAM P. LEWIS, OF CANTON, OHIO.

ART OF MAKING COPPER-COATED IRON OR STEEL SHEETS.

No. 827,378.   Specification of Letters Patent.   Patented July 31, 1906.

Application filed November 23, 1905. Serial No. 288,654.

*To all whom it may concern:*

Be it known that I, WILLIAM P. LEWIS, a citizen of the United States, residing at Canton, in the county of Stark and State of Ohio, have invented a new and useful Improvement in the Art of Making Copper-Coated Iron or Steel Sheets, of which the following is a specification.

The invention relates to a method of welding or uniting copper sheets on the sides of a base-bar of iron or steel to the end that the same may be reduced by rolling into copper-coated sheets, with a flux for facilitating the welding in some cases; and the objects of the improvement are to weld or unite the copper on one or both sides of the bar by the same operation, to bring the sheets by an initial heating and rolling into such intimate contact with the bar that they can be completely welded or united together and reduced in thickness by a final heating and rolling, so that copper-coated iron or steel sheets of any reasonable gage can thus be made with such an intimate joinder of the different metals as will permit the finished sheets to be flexed or stamped or otherwise worked in the various arts without separating the copper from the iron or steel.

These objects are attained by the process herein described in connection with the flux mentioned for welding or uniting in some cases and without the flux in other cases, some of the features of the process being illustrated in the accompanying drawings, in which—

Figure 1:
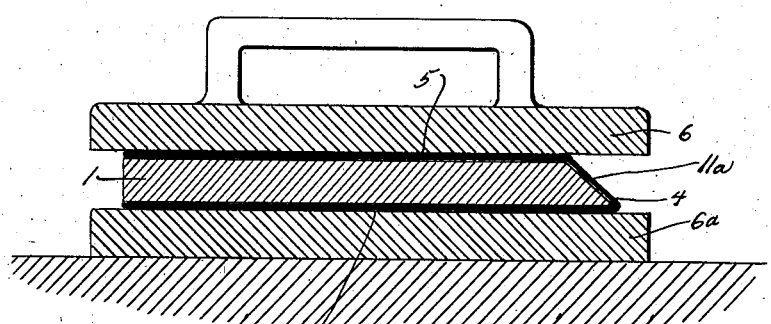
Figure 2:
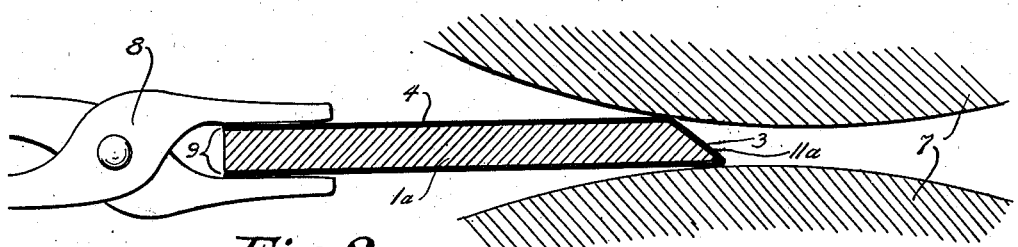
Figure 3:
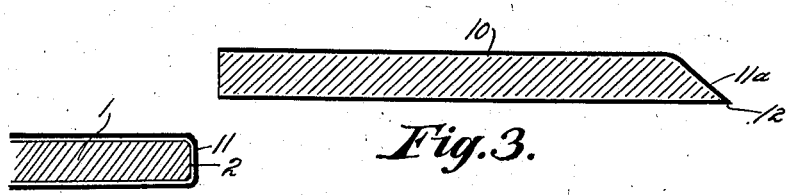
Figures 4, 5:
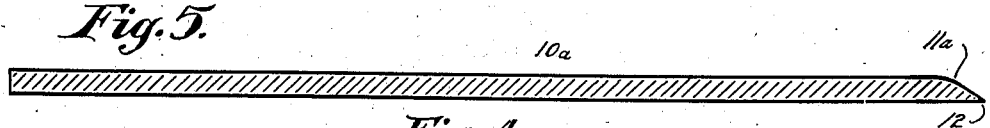

Figure 1 is a cross-section of a base-bar having a beveled edge, showing the preferred manner of folding and flattening the copper sheet thereon for the initial heating; Fig. 2, a similar section illustrating the initial rolling; Fig. 3, a similar section showing the base-bar and copper in intimate contact or partially united for the final heating; Fig. 4, a similar section showing the joinder completed and the coated bar partially reduced by the final rolling; and Fig. 5, a fragmentary cross-section of a base-bar having a square edge, showing a modified manner of folding and flattening the copper sheet thereon before the initial heating.

Similar numerals refer to similar parts throughout the drawings.

The base-bar 1 or 1ª may be either of iron or steel or other similar and suitable metal and for brevity will be hereinafter referred to as the "base-bar," and the bar may be formed with square edges 2, as shown in Fig. 5, or with one edge 3 beveled, as shown in Fig. 1. A convenient size for the bar is ordinarily eight inches wide by one-half inch thick and of such length—say twenty inches—as is desired for the width of the finished coated sheet. The copper sheet 4 is of the same length as the bar, but is preferably a little more than twice its width, so that the sheet can be folded or doubled over one edge of the bar and will completely cover both sides thereof, as shown in Figs. 1 and 2. A twenty-six-gage sheet is a desirable thickness of the copper for use in connection with a half-inch base-bar; but it will be understood that the dimensions and thickness of the bar and sheet can be varied to suit the desired dimensions and thickness of the finished sheet, as well as the desired relative thickness of the copper coating thereon.

The base-bar and the copper sheet are first cleaned, so as to be free from all oxids on the faces to be welded, and this is preferably done in the ordinary manner by "pickling"—that is, by bathing them in a hot dilute solution of sulfuric acid. When a comparatively thick sheet of copper is used which is not to be greatly reduced by rolling, the faces of the base-bar and the copper sheet to be welded are then covered, spread, or washed with a suitable flux, and for this purpose I prefer to dip the bar and the sheet into a hot solution of borax. A desirable manner of making and using this flux is to dissolve one part of borax in twelve parts of hot water and then to keep the solution hot and well agitated for use. The copper sheet is then folded to cover the sides of the bar, as described, and is flatly held thereon, as by the two opposing faces 5 of the blocks 6 and 6ª, in which relation they are heated in a suitable furnace to a dark red or other degree sufficient to somewhat soften the copper. The flattening of the sheet on the sides of the bar is to exclude air from the contiguous surfaces and prevent any oxidation of them, and when blocks as described are used for this purpose they can be retained in the furnace, and thus kept at a comparatively high temperature; but this particular manner of flattening the sheets and excluding the air during the initial heating is not essential to the success of the other features of the process. The base-bar and the covering-sheet thus softened by heating are then forcefully compressed together between hot rolls. This compression completely expels the greater part of the flux when the same is used, and, furthermore, it impresses particles of the partly-softened copper into the metal of the base-bar, as a result of which the copper sheet adheres firmly to the sides of the base-bar as against any ordinary handling or tendency to separate in the final heating and rolling. This adhesion is somewhat as that of a sheet of moistened paper to a flat surface on which it is applied, with the added cleaving in this case arising from the impressed contact of the softened copper, which adherence may amount to a partial welding or uniting. The initial compression is made by passing the sheet-covered bar one or more times sidewise between hot rolls, as 7, for the action of rolls serves better to exclude the flux by squeezing it out from one side of the bar to the other, and, furthermore, the same action serves better to impress the softened surfaces of the metals together by acting successively or in detail, as it were, on the different parts thereof.

The rolls used for reducing the composite bar may be the ordinary hot rolls commonly used in rolling-mills, which obtain and retain their heat from the hot bars which are passed between them, as distinguished from the so-called "cold rolls," which are likewise commonly used in rolling-mills, but which do not become heated because cold sheets only are passed between them. If cold rolls were used in carrying out this process, they would chill the thin sheets of copper on the relatively thick base-bar of steel, and thus prevent a proper uniting of the several laminations.

The folded-over edge of the sheet-covered bar is inserted first between the rolls, as shown in Fig. 2, with the result that the copper sheet is held securely in the proper place on the sides of the bar, and a convenient manner of handling the sheet-covered bar is by means of the ordinary tongs 8, applied on the sides of the sheets over their free edges 9, as shown in the same figure.

The need for the preliminary heating and rolling arises from the fact that if the bar and the sheet are at first brought to the higher heat required for welding or completely uniting them the copper is so soft that the action of the rolls tends to rupture it and, it may be, to squeeze it off the steel instead of welding or uniting it thereto, while by limiting the degree of the initial heating the first rolling is done when the copper is yet comparatively strong and tough, and by partially embedding its particles in the steel, as described, it is afterward sustained and held by the relatively stronger and tougher steel, so that when it is finally brought to the higher heat the action of the rolls does not destroy the continuity of the copper on the steel, but reduces the metals together in substantially the same relative degree of thickness until the sheet is finished. Furthermore, if the initial joinder is made by a mere compression, as distinguished from the action of rolls, there is not initiated that interlocking fibrous form of juncture between the dissimilar metals which not only ultimately marks the finished sheet, but enables the steel to successfully sustain and retain the copper when it is finally heated and rolled. When the copper sheet is in this manner securely attached and, it may be, partly welded or united on the sides of the base-bar, the composite bar 10 thus formed is then finally heated to a suitable welding or uniting degree in an ordinary furnace and without any special appliances or covering, after which the bar is finally compressed between hot rolls, as before, and the joinder of the different metals is thereby completed. In the final compression the rolls can be brought closer together from time to time in the usual manner, and the bar is thus gradually reduced to the thickness of the desired finished sheet, and by this method of rolling the surfaces of the copper sheet are in a manner worked into the contiguous surfaces of the base-bar, as well as being welded or united thereon, to the effect that a much more intimate cleaving of the two metals is accomplished than by other processes. This result is attained because the copper has been so firmly joined to the base-bar by the initial heating and compression that when the composite bar is brought to the welding or uniting heat it can be freely handled and completely welded or united and reduced by the same operation of the rolls without any tendency of the two metals to separate or split apart by the action of the rolls, and the more successful joinder of the metals by this process is no doubt largely due to the peculiar rearrangement of the particles of the metals which are drawn out by the action of the rolls, so as to form a fibrous structure, the intermingling and interlocking of which fibers make a joinder of the dissimilar metals that might be distinguished from a technical welding thereof brought about by hammering or mere compression.

The folded-over edge of the base-bar is preferably beveled, as at 3 in Fig. 1, because in the final rolling the part 11 of the copper sheet which covers the square edge 2, as in Fig. 5, is cut at the corners and finally separated from the edge of the bar and is thus wasted as scrap, while that part 11ª of the sheet which covers the beveled edge is gradually rolled down as the bar is reduced and becomes part of the coating on the side of the finished sheet, as particularly shown in Fig. 4, and there is consequently no wasting of copper unless it be at the extremely thin acute angle 12 of the beveled edge.

While the use of a flux composed of a hot solution of borax is described as preferred and is used to facilitate the welding in some cases, it will be understood that any other well-known and suitable flux can be used for this purpose and that for welding the thinner sheets of copper or the thicker sheets when they are to be greatly reduced by rolling no flux whatever is required in the process herein described. It is also evident that the folding of the copper sheet over the edge of the base-bar is not an essential feature of the process, although it is a very desirable means for holding the sheet and bar in proper relative position, and that a copper sheet can be welded on one side only of a base-bar by the same means herein described for welding a sheet on both sides thereof, and, furthermore, it is apparent that sheets of other metal than of copper can be welded on the sides of a suitable base-bar and the same reduced to thin sheets by the same method herein described for making copper-coated sheets.

What I claim as my invention, and desire to secure by Letters Patent, is—

1. The process of making a copper-coated iron or steel sheet consisting in folding a clean copper sheet over one edge of a clean iron or steel bar and flattening it on the sides thereof with an intervening flux, then heating the sheet and the bar to soften the copper and passing them folded edge first between hot compressing-rolls, and then bringing them to a uniting heat and joining and reducing them between hot compressing-rolls.

2. The process of making a copper-coated iron or steel sheet consisting in folding a clean copper sheet over one edge of a clean iron or steel bar and flattening it on the sides thereof, then heating the sheet and the bar to soften the copper and passing them folded edge first between hot compressing-rolls, and then bringing them to a uniting heat and joining and reducing them between hot compressing-rolls.

3. In making a copper-coated iron or steel sheet, the process of folding a copper sheet over one edge of an iron or steel bar and flattening it on the sides thereof, then heating the sheet and the bar to soften the copper and passing them folded edge first between hot compressing-rolls, and then bringing them to a uniting heat and again compressing them between hot rolls.

4. In making a copper-coated iron or steel sheet, the process of flattening a copper sheet on the side of an iron or steel bar, then heating the sheet and the bar to soften the copper and compressing them between hot rolls, and then bringing them to a uniting heat and again compressing them between hot rolls.

5. In making a laminated sheet, the process of forming a bar with one edge beveled and folding a sheet over the beveled edge to cover the sides of the bar, and then heating the sheet and the bar and passing them folded edge first between hot compressing-rolls.

In testimony whereof I have signed my name to this specification in the presence of two subscribing witnesses.

WILLIAM P. LEWIS.

Witnesses:
HARRY FREASE,
OBED C. BILLMAN.